(12) United States Patent
Roche

(10) Patent No.: US 11,568,150 B2
(45) Date of Patent: Jan. 31, 2023

(54) METHODS AND APPARATUS TO IMPROVE DISAMBIGUATION AND INTERPRETATION IN AUTOMATED TEXT ANALYSIS USING TRANSDUCERS APPLIED ON A STRUCTURED LANGUAGE SPACE

(71) Applicant: CLRV Technologies, LLC, Belmont, MA (US)

(72) Inventor: Emmanuel Roche, Belmont, MA (US)

(73) Assignee: CLRV Technologies, LLC, Belmont, MA (US)

(\*) Notice: Subject to any disclaimer, the term of this patent is extended or adjusted under 35 U.S.C. 154(b) by 58 days.

(21) Appl. No.: 16/922,210

(22) Filed: Jul. 7, 2020

(65) Prior Publication Data
US 2021/0019476 A1 Jan. 21, 2021

Related U.S. Application Data

(63) Continuation of application No. 16/517,456, filed on Jul. 19, 2019, now Pat. No. 10,936,825.

(51) Int. Cl.
*G06F 40/30* (2020.01)
*G06F 40/211* (2020.01)
*G06F 40/221* (2020.01)
*G06F 8/41* (2018.01)

(52) U.S. Cl.
CPC .............. *G06F 40/30* (2020.01); *G06F 8/436* (2013.01); *G06F 40/211* (2020.01); *G06F 40/221* (2020.01)

(58) Field of Classification Search
CPC ...... G06F 40/30; G06F 40/211; G06F 40/221; G06F 8/436
See application file for complete search history.

(56) References Cited

U.S. PATENT DOCUMENTS

| | | | | |
|---|---|---|---|---|
| 5,610,812 A | * | 3/1997 | Schabes | G06F 40/211 704/4 |
| 6,816,830 B1 | | 11/2004 | Kempe | |
| 8,700,404 B1 | * | 4/2014 | Chotimongkol | G10L 15/18 704/255 |
| 9,928,040 B2 | * | 3/2018 | Tarlow | G06F 11/3604 |
| 9,972,314 B2 | * | 5/2018 | Wang | G10L 15/30 |
| 10,936,825 B1 | | 3/2021 | Roche | |

(Continued)

OTHER PUBLICATIONS

Roche et al. (ed.), Finite-State Language Processing. Parsing with Finite-State Transducers. 1997, pp. 241-281 (Year: 1997).*

(Continued)

*Primary Examiner* — Michelle M Koeth
(74) *Attorney, Agent, or Firm* — Smith Baluch LLP

(57) ABSTRACT

Methods and apparatus for automated processing of natural language text is described. The text can be preprocessed to produce language-space data that includes descriptive data elements for words. Source code that includes linguistic expressions, and that may be written in a programming language that is user-friendly to linguists, can be compiled to produce finite-state transducers and bi-machine transducers that may be applied directly to the language-space data by a language-processing virtual machine. The language-processing virtual machine can select and execute code segments identified in the finite-state and/or bi-machine transducers to disambiguate meanings of words in the text.

24 Claims, 9 Drawing Sheets

(56) References Cited

U.S. PATENT DOCUMENTS

| | | | |
|---|---|---|---|
| 2003/0046055 A1* | 3/2003 | Kempe | G06F 40/232 |
| | | | 704/E15.022 |
| 2004/0128122 A1 | 7/2004 | Privault et al. | |
| 2008/0052644 A1 | 2/2008 | Ashar et al. | |
| 2008/0122665 A1 | 5/2008 | Paris | |
| 2016/0188573 A1* | 6/2016 | Tang | G06F 40/284 |
| | | | 704/9 |

OTHER PUBLICATIONS

Allauzen et al., OpenFst: A General and Efficient Weighted Finite-State Transducer Library. International Conference on Implementation and Application of Automata. Jul. 2007. 12 pages.

Berstel, Transductions and Context-Free Languages. Vieweg+Teubner Verlag. 1979. 6 pages. ISBN:978-3-663-09367-1.

Culotta et al., Confidence Estimation for information Extraction. Proceedings of HLT-NAACL 2004: Short Papers. May 2004. 4 pages.

Eilenberg, Automata, Languages, and Machines, vol. A. Academic Press, New York and London. 1974. 4 pages.

Harris, A Theory of Language and Information. A Mathematical Approach, Clarendon Press, Oxford. 1991. 4 pages. ISBN: 978-0-19-824224-6.

International Search Report and Written Opinion in connection with International Application No. PCT/US2020/020842, dated Jun. 29, 2020.

Jochim et al., Named Entity Recognition in the Medical Domain with Constrained CRF Models. Proceedings of the 15th Conference of the European Chapter of the Association for Computational Linguistics: vol. 1, Long Papers. Apr. 2017. pp. 839-849.

Joshi et al., Tree-Adjoining Grammars. Handbook of Formal Languages. Springer-Vergiag Berlin Heidelberg, 1997, 55 pages.

Karttunen, Constructing Lexical Transducers. The Proceedings of the 15th International Conference on Computational Linguistics. Aug. 1994. 6 pages.

Klein et al., Accurate Unlexicalized Parsing. Proceedings of the 41st Annual Meeting of the Association for Computational Linguistics. 2003. 8 pages.

Levy et al., Tregex and Tsurgeon: tools for querying and manipulating tree data structures. Proceedings of the Fifth International Conference on Language Resources and Evaluation. 2006, 4 pages.

Manning, Part-of-Speech Tagging from 97% to 100%: Is It Time for Some Linguistics? Computational Linguistics and Intelligent Text Processing. 2011. Lecture Notes in Computer Science. 19 pages.

Mohri, Minimization algorithms for sequential transducers. Theoretical Computer Science. 2000;234:177-201.

Roche et al. (ed), Finite-State Language Processing. Parsing with Finite-State Transducers, 1997. 22 pages.

Roche, Text Disambiguation by Finite State Automata, An Algorithm and Experiments in Corpora. Coling '92: Proceedings of the 14th conference on Computational Linguistics. Aug. 23, 1992;3:993-997.

Roche, Two Parsing Algorithms by Means of Finite State Transducers, Coling '94: Proceedings of the 15th conference on Computational Linguistics. Aug. 5, 1994;1:431-435.

Schutzenberger, A Remark on Finite Transducers. Information and Control. 1961 4:185-196.

Suchanek et al., YAGO: A Core of Semantic Knowledge Unifying WordNet and Wikipedia. WWW 2007. Track: Semantic Web. p. 697-706.

Wang et al., Knowledge Graph and Text Jointly Embedding. Proceedings of the 2014 Conference on Empirical Methods in Natural Language Processing (EMNLP) 2014, 11 pages.

Zhou et al., Event extraction from Twitter using Non-Parametric Bayesian Mixture Model with Word Embeddings. Proceedings of the 15th Conference of the European Chapter of the Association for Computational Linguistics: vol. 1, Long Papers, Apr. 2017, pp. 808-817. 10 pages.

Stanford Parser. Last updated Sep. 12, 2016. Accessed at http://nlp.stanford.edu:8080/parser/. 2 pages.

* cited by examiner (1) [VG has been _Ving:! ] _Det
(2) [ADVP (// for _Prep:! ) a (// long _A:! ) (// time _N:! ) ] _$
(3) _PN [VG_NHUM:! <VG~:! read |> ]
(4) <VG> [NP _Det _N ] <ADVP>
(4) $_ [PERSON:! _PN ] <VG_NHUM>!
(5) <VG>! <NP|:! _Det:! _N:! |> <ADVP>
(6) <VG|! has been ~> <NP> <ADVP|:! for a long time |>
(7) [S <PERSON>! <VG_NHUM>! <NP> ] <ADVP>
(8) $_ [S:! <S|:! <PERSON>! <VG|! has been ~> <NP>! |> <ADVP>! ] _$
(9) [S_NHUM_READ_BOOK:! <S| <PERSON>! <VG~! read |> <NP~ book |> |> ]

METHODS AND APPARATUS TO IMPROVE DISAMBIGUATION AND INTERPRETATION IN AUTOMATED TEXT ANALYSIS USING TRANSDUCERS APPLIED ON A STRUCTURED LANGUAGE SPACE

RELATED APPLICATION

This Application is a continuation of U.S. application Ser. No. 16/517,456, entitled "Methods and Apparatus to Improve Disambiguation and Interpretation in Automated Text Analysis Using Transducers Applied on a Structured Language Space," filed on Jul. 19, 2019, which is herein incorporated by reference in its entirety.

FIELD

Described apparatus and methods relate to computer-implemented embodiments that improve the speed and accuracy with which natural language text, for example, can be automatically processed and interpreted.

BACKGROUND

Natural language can be very challenging to process and obtain accurate representations using computer-implemented methods. An example natural language processor is the Stanford Parser that is accessible using hypertext transfer protocol at address: //nlp.stanford.edu:8080/parser/. Difficulties can occur because some words can have many meanings, and a machine can err when determining which meaning of a plurality of meanings is a correct meaning to use in the context of text in which the words appear. Sentences that appear very obvious to any human reader can require computationally intensive algorithms for a machine to decipher correctly. If the natural language is not interpreted correctly by a language processor, then the ability to automatically search and/or extract meaningful and correct information from natural language text, for example, is compromised.

SUMMARY

The present invention relates to methods and apparatus that improve computer-implemented analysis, interpretation, and representation of natural language. According to some implementations, received natural language can be processed automatically to generate language space data that provides an initial representation of the received natural language. A finite state transducer (FST) or bi-machine transducer (BMT) can be applied directly on the language space data one or more times to generate a modified language space in which the meanings of words in the received natural language have been disambiguated. Application of the finite state transducer or bi-machine transducer can further add information about sentence structure to the modified language space. According to some embodiments, a finite state transducer or bi-machine transducer can include a plurality of objects (which can include code segments to be executed) and expressive elements that can indicate relational aspects between data elements in a language space or modified language space.

Some embodiments relate to method of automated text analysis. The method may comprise acts of: processing the text to generate a language space having one or more descriptive data elements associated with one or more words in the text, wherein a word in the text has multiple meanings; and executing an operation with a first finite-state transducer or first bi-machine transducer to process a sentence in the language space containing the word. Such an operation may comprise acts of: identifying a match between a first input element in the first finite-state transducer or first bi-machine transducer and a first identifier of a first descriptive data element in the language space associated with the word in the sentence; identifying an expressive element in the first finite-state transducer or first bi-machine transducer following the first input element, wherein the expressive element indicates a relational aspect between the first descriptive data element and a second descriptive data element in the language space; in response to identifying the expressive element, updating transition data that tracks relational aspects of descriptive data elements in the language space; and executing a first code segment, based at least in part on the updated transition data, to produce a modified language space in which the meaning of the word in the sentence associated with the first descriptive data element is disambiguated.

Some embodiments relate to a language-processing system comprising at least one processor programmed to: process text that includes one or more sentences to generate a language space having one or more descriptive data elements that are associated with words in the text; apply a first finite-state transducer or first bi-machine transducer to process sentences in the language space; and identify an expressive element in the first finite-state transducer or first bi-machine transducer that identifies a relational aspect between a first descriptive data element and a second descriptive data element in a sentence of the language space.

Some embodiments relate to computer-readable medium encoding instructions that, when executed by at least one processor, adapt the at least one processor to: process text that includes one or more sentences to generate a language space that includes one or more descriptive data elements associated with one or more words in the text, wherein a word in the text has multiple meanings; and execute an operation with a finite-state transducer or bi-machine transducer to process a sentence in the language space containing the word. The operation may comprise acts of: identifying a match between an input element in the finite-state transducer or bi-machine transducer and an identifier of a first descriptive data element in the language space associated with the word in the sentence; identifying an expressive element in the finite-state transducer or bi-machine transducer following the input element, wherein the expressive element identifies a relational aspect between the first descriptive data element and a second descriptive data element in the language space; in response to identifying the expressive element, updating transition data that records relational aspects of descriptive data elements in the language space; and executing a code segment, based at least in part on the updated transition data, to produce a modified language space in which the meaning of the word in the sentence associated with the first descriptive data element is disambiguated.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

The features and advantages of the present invention will become more apparent from the detailed description set forth below when taken in conjunction with the drawings.

DETAILED DESCRIPTION

Figure 1:
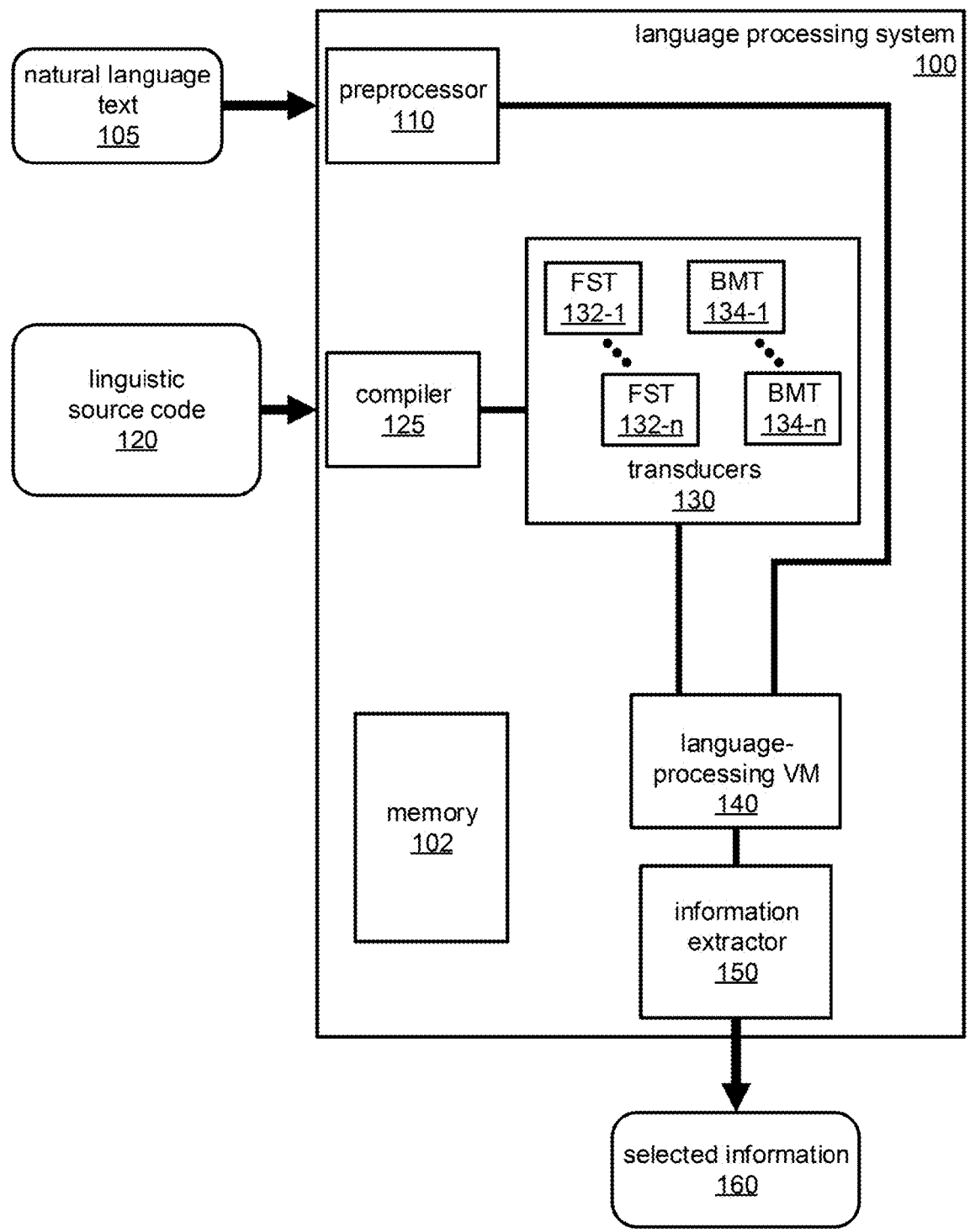
FIG. 1 is a block-diagram representation of a language-processing system 100, according to some embodiments.

In overview, FIG. 1 illustrates an example of a language-processing system 100, according to some embodiments. A language-processing system 100 may include a preprocessor 110 and a language-processing virtual machine 140, in some embodiments. In some cases, a language-processing system 100 may further include or access a compiler 125, memory 102, and an information extractor 150. A language-processing system 100 may be configured to process natural language text 105, for example, and produce modified language-space data (described below) that is representative of the natural language text and includes at least some words for which meanings have been disambiguated. The modified language-space data can be processed by an information extractor 150, for example, to more quickly and accurately identify and locate selected information within the natural language text 105 than is possible with conventional language processing and searching tools.

According to some embodiments, transducers 130 can be produced by compiler 125 from coded linguistic expressions (e.g., linguistic source code 120). These transducers can be applied efficiently, by the language-processing virtual machine 140, to process data structures derived from the natural language text 105. By using transducers according to the present embodiments, the language-processing virtual machine 140 can process large bodies of text having lengthy sentences significantly faster than conventional approaches to natural language processing. The application of the transducers can add further information (e.g., mark-up information) to the derived data structures that improves the accuracy of automated queried search results, for example, when extracting information from the natural language text 105.

In further detail, natural language can be provided in the form of text 105 to the language-processing system 100, according to some embodiments. The text may be rendered as binary data. In some implementations, the natural language text 105 may be received from an external device or data store. The natural language text can be, for example, descriptive text relating to one or more subjects, a transcription of a news broadcast, a transcription of a speech, text from a publication, etc. In some implementations, the natural language text 105 may comprise multiple documents that are to be analyzed (e.g., multiple reports from an institution, multiple records from an on-line source, such as all text for Wikipedia pages, multiple publications relating to a particular subject of interest, etc.) The natural language text 105 may be produced by any suitable method including, but not limited to, automated speech recognition of manual typing. The natural language text 105 may be input to preprocessor 110 from one or more data files, typed in directly, or retrieved from an on-line source or sources, for example.

Preprocessor 110 may receive text 105 to be analyzed by the language-processing system 100. A preprocessor 110 may be implemented as code executing on at least one processor. In some implementations, a preprocessor may be implemented as at least one application-specific integrated circuit (ASIC) and/or field-programmable gate array (FPGA) configured to carry out processing tasks on the natural language text 105. In some cases, a preprocessor 110 may be implemented as a combination of code and firmware configured to carry out parsing tasks, such as dictionary look-ups, lemmatization, and/or stemming for received words. Preprocessor 110 may preprocess the natural language text 105 and generate language-space data 200, which is described in further detail in connection with FIG. 2.

Linguistic source code 120 may comprise specialized code having instruction formats that may be more user-friendly for a linguistic expert. Example instructions are described in connection with FIG. 3, although the invention is not limited to the particular instructions and formats shown. The linguistic source code 120 may comprise, among other things, a combination of text and symbols expressive of linguistic patterns and/or linguistic constraints. The inventor has recognized and appreciated that conventional approaches to natural language processing adapt existing programming languages (e.g., C, Fortran, etc.) to the tasks of natural language processing. This approach can make it difficult for someone with an expertise in linguistics to develop code for natural language processing. In such cases, linguists may work in collaboration with computer programming experts to develop suitable code for natural language processing. A specialized linguistic source code 120 can make it easier for linguistic experts to develop code for natural language processing without the need for programmers having expertise in conventional programming languages.

Compiler 125 may also be specialized to process and compile the linguistic source code 120. A compiler 125 may comprise specialized code that executes on at least one processor. According to some embodiments, compiler 125 can compile lines of linguistic source code into objects, executable code, and transducers 130 that are used by the language-processing virtual machine 140.

In some implementations, there can be two types of transducers 130 that are used by the language-processing system, and there may be one or more transducers of each type. A first type of transducer may be a finite state transducer (FST) 132-1, . . . 132-*n*. A second type of transducer may be a bi-machine transducer (BMT) 134-1, . . . 134-*n*. According to some embodiments, the finite-state transducers 132-1, . . . 132-*n* and bi-machine transducers 134-1, . . . 134-*n* comprise binary objects that operate to dynamically select code that modifies the language-space data 200.

The code selected when applying a transducer can be dependent, at least in part, upon path traversals identified by the transducers and natural language text. According to some implementations, the finite-state transducers 132-1, . . . 132-*n* and/or bi-machine transducers 134-1, . . . 134-*n* may be generated by the compiler 125 from the linguistic source code 120. The two types of transducers are described further in connection with FIG. 5A and FIG. 5B.

A language-processing virtual machine 140 may be implemented as code executing on at least one processor. In some implementations, a language-processing virtual machine may be implemented as at least one application-specific integrated circuit (ASIC) and/or field-programmable gate array (FPGA) configured to carry out processing tasks (e.g., word disambiguation tasks described in more detail below) for received language-space data 200. In some cases, a language-processing virtual machine 140 may be implemented as a combination of code and firmware configured to carry out such processing tasks.

Figure 7:
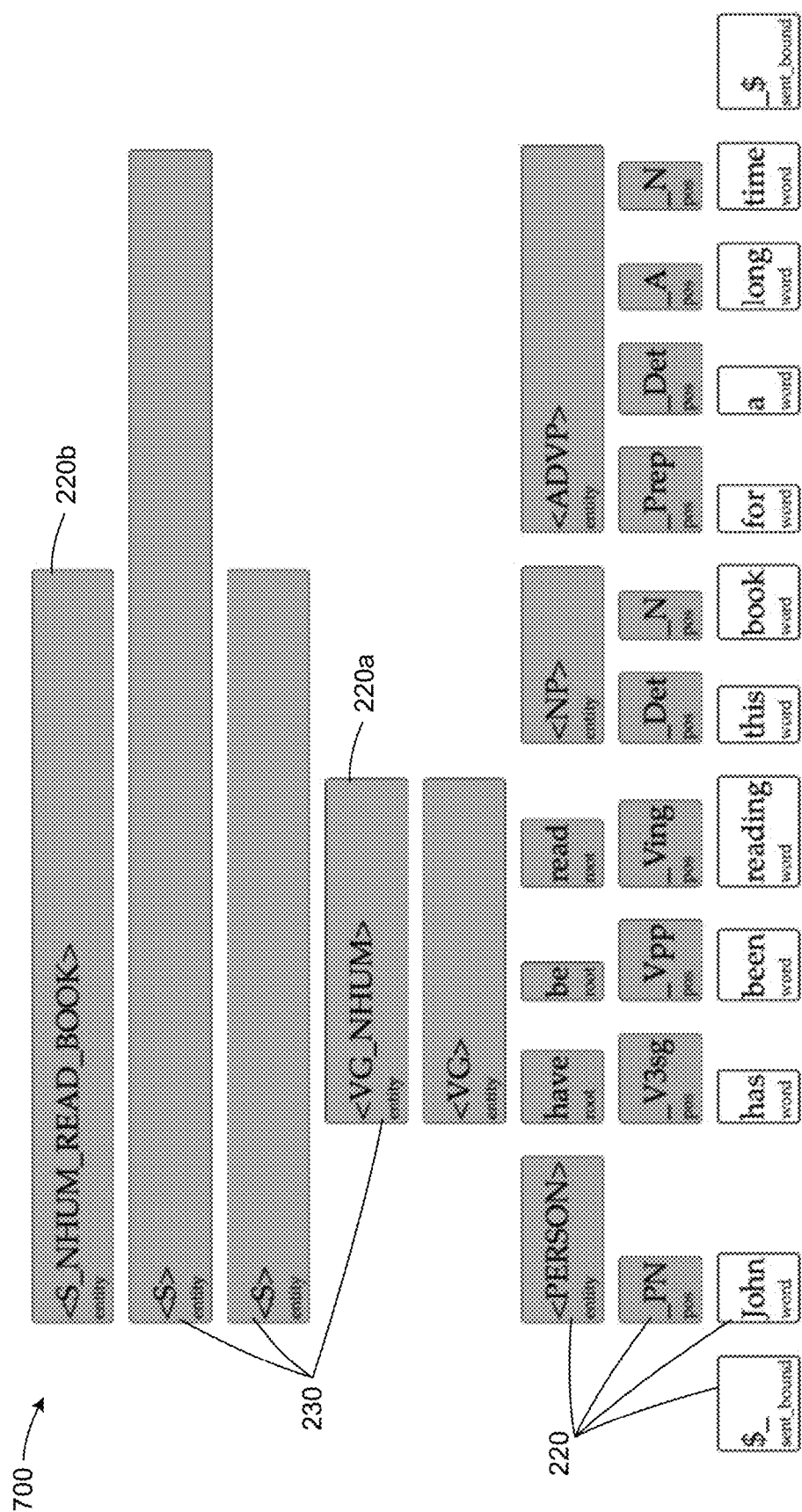
FIG. 7 depicts an example representation of modified language-space data produced from the language-space data of FIG. 2, according to some embodiments.

A language-processing virtual machine 140 may process the language-space data 200 that is output from the preprocessor 110, as indicated in FIG. 1, and output modified language-space data (described further below) in which meanings of words in the natural language text 105 have been disambiguated. When processing the language-space data 200, the language-processing virtual machine 140 may use finite-state transducers 132-1, . . . 132-*n* and/or bi-machine transducers 134-1, . . . 134-*n* to, among other tasks, disambiguate word meanings and produce the modified language-space data, an example of which is shown in FIG. 7.

A language-processing system 100 may also include an information extractor 150. However, an information extractor 150 may be external to the language-processing system 100 in some cases and accessed over a network, for example. In either case, modified language space data produced by the language-processing virtual machine 140 can be provided to the information extractor.

An information extractor 150 may be implemented as code executing on at least one processor. In some implementations, an information extractor 150 may be implemented as at least one ASIC or FPGA configured to carry out information location and/or extraction tasks. In some cases, an information extractor 150 may be implemented as a combination of code and firmware configured to carry out information location and/or extraction tasks. An information extractor 150 may be adapted to identify words, word groupings, and/or other entities in modified language-space data based on search criterion, for example, and output selected information 160 for review by a user, for storage in memory, or for further automated processing. In some implementations, modified language-space data that includes disambiguated words may be output for user review. In some implementations, the selected information 160 is output to one or more data files or one or more displays.

Figure 2:
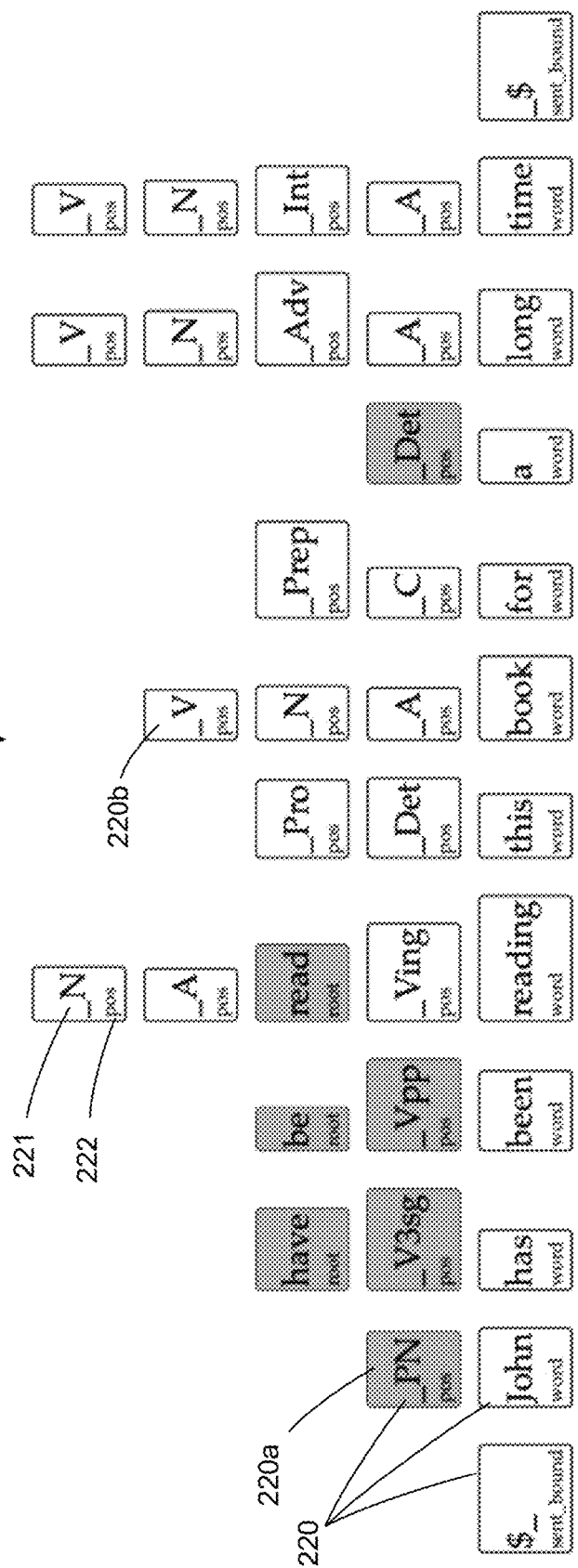
FIG. 2 depicts an example representation of language-space data, according to some embodiments.

FIG. 2 illustrates an example representation of language space data 200 for a simple sentence of text 202, "John has been reading a book." Language space data 200 can comprise stored data representative of a plurality of descriptive data elements 220. A sentence in the processed text may be part of a larger text, document, or other rendering of natural language text 105. For example, the text can include many sentences, paragraphs, pages, chapters, sections, documents, etc. of text. As noted above, the text may be rendered as binary data. Language-space data 200 for a sentence may be generated by a preprocessor 110 from the text 202.

In this simplified example, the natural language text is preprocessed into a plurality of descriptive data elements 220 illustrated simply as blocks in FIG. 2A. A descriptive data element 220 may be embodied as a collection of data and each descriptive data element 220 may comprise a plurality of data blocks or data fields containing information about a word or element of the text 202. There may be more data elements 220 than there are words in the text 202. According to some embodiments, the preprocessor 110 may be configured to tokenize the text (e.g., split a sentence into a sequence of individual words and construct one or more descriptive data elements 220 for each word). In some implementations, the preprocessor may perform a dictionary look-up to find potential parts of speech for each word and/or other features for each word, such as possible meanings, roots, variations in spelling, translations, etc. In some implementations, a preprocessor 110 may additionally or alternatively perform lemmatization of words and/or use stemming.

One or more descriptive data elements 220 may be associated with each word of the text 202 and provide further information about potential uses of the word. For example, the word "reading" of text 202 has three descriptive elements 220 associated with it (illustrated using a vertical column in FIG. 2). In a database, descriptive data elements 220 may be associated with a word of text using any suitable means, such as tags, pointers, or using a relational database structure, for example. In this example, the word "reading" has three parts of speech (verb, noun, and adjective) associated with it.

The preprocessor 110 may produce additional descriptive elements 220 such as bounding descriptive elements that are used to represent beginning and ends of sentences (e.g., illustrated in FIG. 2 as a descriptive element containing the character sequence "$_" and "_$"), paragraphs, sections, chapters, etc. In some implementations, there may be punctuation descriptive data elements that are used to represent different types of punctuation marks.

According to some embodiments, a descriptive data element 220 in language-space data 200 can include an identifier 221 and a type 222, and may further include additional information relevant to the descriptive data element. An identifier 221 may comprise data indicating a potential use for or further information about a word of the text with which the descriptive element is associated (e.g., potential uses). A type 222 may comprise data providing further information about the identifier 221 and/or word.

According to some embodiments, the identifier 221 may be represented as a character string (e.g., "_Det", "_V", "_N", etc.), which can be rendered as binary data. For example, the character string "_V" associated with the word "book" may indicate that "book" may be used as a verb "V" which can follow a text sequence, indicated by the symbol "_". Also, the character string "_N" may indicate that "book" may be used as a noun. Further, the character string "_A" may indicate that "book" may be used as an adjective. Accordingly, "book" in the example text 202 can have three possible meanings, which must be disambiguated to one of the three meanings by the language-processing system 100. Other examples of identifiers 221 in the illustrated language space of FIG. 2 include, but are not limited to, "_Det" which may represent a determiner, "_Pro" which may represent a pronoun, "_Prep" which may represent a preposition, "_V3sg" which may represent the third person singular form of a verb, "_Vpp" which may represent past participle form of a verb, "_Ving" which may represent a verb form ending in "ing", "_Int" which may represent an intransitive verb form, "_PN" which may represent a proper noun, "_C" which may represent a conjunction, and "_Adv" which may represent an adverb. Additional identifiers are also possible, and identifiers 221 may use different text and symbol representations than those shown in FIG. 2.

In some implementations, a type 222 in language-space data 200, 215 may be represented as a character string or numeric sequence, which can be rendered as binary data. In the illustrated example, the string "pos" is used to represent a part of speech, the string "root" is used to represent a root of a verb, the string "word" is used to represent a received word of natural language input, and the string "sent_bound" is used to represent a starting or ending point of a sentence. Additional types 222 may be employed and/or alternative representations may be used for types 222 than those shown in FIG. 2.

The invention is not limited to only the descriptive elements 220, identifiers 221, and types 222 shown in FIG. 2. In a language-processing system 100, language-space data 200 can include many more and different descriptive elements 220, identifiers 221, and types 222 than those shown in the example of FIG. 2. Different character strings or alphanumeric sequences may be used to represent identifiers 221 and types 222 than are used in the illustrated example. For example, "_vb" may be used to represent a verb following a sequence of text. In this regard, virtually any character strings and alphanumeric sequences may be used to represent identifiers 221 and types 222. According to some embodiments, a language-processing system 100 may include (in memory 102, for example) descriptive elements 220, identifiers 221, types 222, and additional information for all the words of a dictionary and all the parts of speech and meanings for which a word may be used, for example.

As noted above, there can be additional information included or associated with each descriptive data element 220. Examples of additional information include, but are not limited to, a starting position, an ending position, a weight, a certainty indicator, a tag, and an attribute-value pair. A starting and ending position may be assigned by the preprocessor 110 to indicate where the descriptive data element appears in the sentence being processed. In the example of FIG. 2, the word "has" may be assigned a starting position of 2 and ending position of 2. Some descriptive data elements 220 generated by the preprocessor 110 may span multiple words and therefore have different starting and ending positions.

In some implementations, a weight (e.g., numerical weighting value) may be assigned to one or more descriptive data elements in the language space data 200. A weighting value may be higher for words carrying more contextual meaning within the sentence. For example, verbs such as "reading" and their associated descriptive data elements 220 may be assigned a higher weighting value by preprocessor 110 than determiners such as "a" and "this" and their associated descriptive data elements 220. According to some embodiments, weighting values may be used by the language-processing virtual machine 140 to calculate a level of confidence of a sentence interpretation by the language-processing system 100. For example, words and associated descriptive data elements 220 with higher weighting values that are identified as being a "certain" or accurate interpretation will contribute more to a level of confidence of a sentence interpretation than words and associated descriptive data elements 220 with lower weighting values. A level of confidence for a sentence may be expressed as a percentage according to some embodiments (e.g., 94% confidence in a correct interpretation of the sentence and/or all words within the sentence).

A certainty indicator can also be included with one or more descriptive data elements 220. A certainty indicator may be added by the preprocessor 110 and/or language-processing virtual machine 140. In some implementations, a certainty indicator may be embodied as a binary value (e.g., uncertain=0, certain=1). In other cases, a certainty indicator may be embodied as having more than two values. In some cases, a certainty indicator may be visually rendered as shading or coloring (as depicted in FIG. 2). For example, descriptive data elements 220 that are determined to be certain may be visually rendered with a first shading or coloring 220a (gray in the illustrated example), whereas descriptive data elements 220 that are determined to be uncertain may be visually rendered with a second shading or coloring 220b. A preprocessor 110 may assign a certainty indicator of 1 or "certain," for example, when the preprocessor finds only one possible descriptive data element of a type 222 and identifier 221 associated with a received word (e.g., parts of speech for the words "John" and "a" in the illustrated example). As another example and referring to FIG. 2, the descriptive data element 220 of type "root" and having the identifier "have" can be marked as "certain" by the preprocessor 110 for the word "has," because the word "has" has only the root form "have" upon a dictionary look-up.

According to some embodiments, one or more tags may be associated with one or more descriptive data elements 220. A tag may be any alpha-numeric sequence rendered as binary data that can provide a reference or link to the descriptive data element. In some implementations, a tag may be descriptive of one or more descriptive data elements. For example, a tag "#verb" may be included with all descriptive data elements 220 associated with verbs. Other tag forms and uses may be employed additionally or alternatively.

In some implementations, descriptive data elements 220 may include attribute-value pairs. Attribute-value information can be a flexible way to associate a wide range of information to the descriptive data elements 220. An example attribute value pair could be (gender, male), where "gender" is an attribute and "male" is a value that could be added to one or more descriptive data elements 220 (to a descriptive data element for the word "he," for example). In some languages, nouns, articles, and other parts of speech can have required genders. In such cases, attribute-value pairs may aid in disambiguating words. Another type of attribute could be "topic," where there could be a large varieties of values, such as history, science, psychology, local news, etc. As an example, an attribute-value pair (topic, history) could be associated with a descriptive data element 220 for the phrase "the battle of Gettysburg," whereas the attribute-value pair (topic, science) could be associated with the phrase "the general theory of relativity."

In some implementations, descriptive elements 220 can further include one or more translations to one or more foreign languages. Additionally, a descriptive element 220 may include a phonetic pronunciation of a translation. Accordingly, the language-processing system may be used in a language-translation tool to translate text from a first language to a second language.

Referring again to FIG. 1, preprocessor 110 may provide language space data 200 to a language-processing virtual machine 140 that operates on the language space data 200 with one or more transducers 130. The transducers 130 may be produced by a compiler 125 as a result of processing and compiling linguistic source code 120 that is received by the compiler. The linguistic source code 120 may be prepared by a linguistic expert or any user, according to some embodiments, and provided to the compiler 125 for processing into transducers 130.

Figure 3:
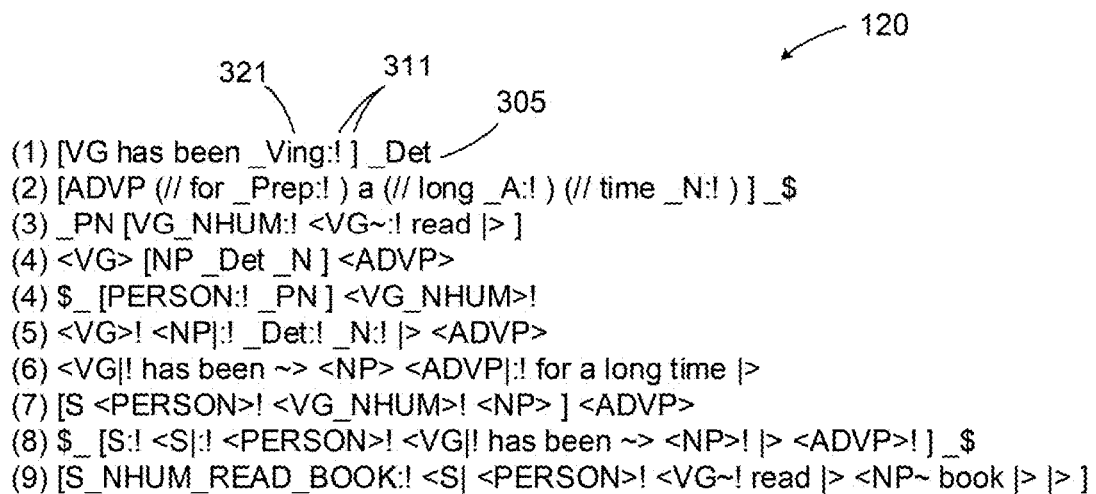
FIG. 3 depicts an example of linguistic source code, according to some embodiments.

FIG. 3 depicts example linguistic source code 120 that may be prepared by a linguistic expert or a user of the language-processing system 100, though the invention is not limited to only the source code and style shown in FIG. 3. According to some embodiments, linguistic source code 120 may comprise a plurality of expressions 305 that include symbols, words, word structures, and grammatical patterns that may appear in natural language. In some cases, an expression 305 may be representative of a linguistic rule (e.g., a grammatical or syntax rule). An expression 305 may include a portion of text and may pertain to sub-structure within a sentence, according to some embodiments.

In some implementations, an expression 305 may include instructional symbols 311 (e.g., "[", ":!", "]") and identifiers 321. At least some identifiers 321 in an expression 305 may correspond to identifiers 221 of descriptive data elements 220 (e.g., "VG", "Ving", "_Det"). At least some of the identifiers 321 may compile into identifiers of objects that are used to build a transducer 130. The identifiers of the objects may be tested for a match with identifiers 221 in the language-space data 200 during processing of the language space data by the virtual machine 140. At least some instructional symbols 311, when compiled by the compiler 125, may identify code to be executed, cause the execution of code, or compile into executable code. The compiled instructional symbols 311 may each be associated with an object along with a compiled identifier 321 (e.g., to create a binary object for a transducer 130).

An instructional symbol 311 may identify a particular action to be performed by the language-processing system. For example, the illustrated symbol "[" may indicate that construction of a descriptive data element shall begin, and the symbol "]" may indicate that construction of the descriptive data element shall end. An identifier 321 following the instructional symbol 311 (e.g., "VG") may identify which type of descriptive data element shall be constructed, according to some embodiments. A word or word grouping following an instructional symbol 311 may indicate a triggering event, e.g., a condition upon which code associated with the instructional symbol 311 is to be executed. Referring to the example expression 305 shown in FIG. 3, the sequence "VG has been" may get compiled into a sequence of objects that cause the language processing system 100 to begin construction of a descriptive data element 220 having an identifier of "VG" (e.g., verb group) when the two words "has been" are detected in sequence in the language space data 200.

Figure 4:
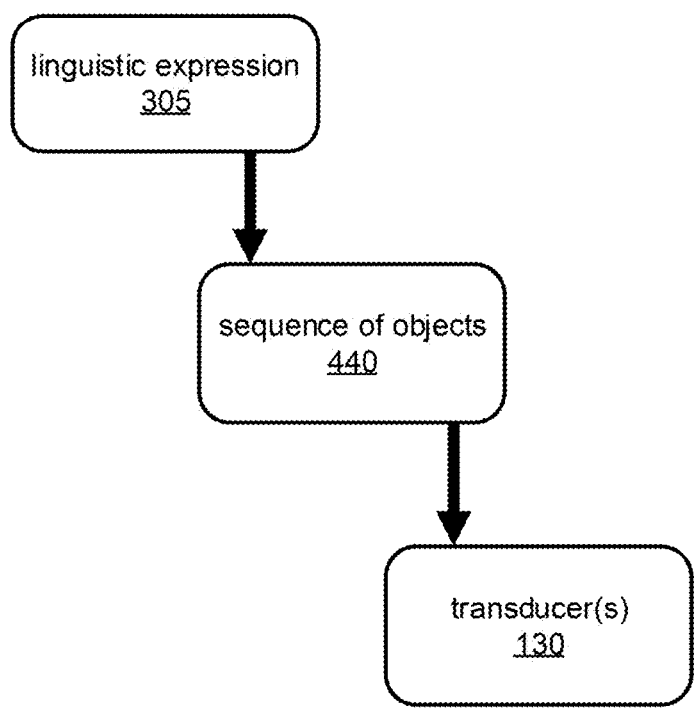
FIG. 4 depicts an example compilation process from linguistic source code to one or more transducers that can be applied by a virtual machine on language-space data, according to some embodiments.

In some embodiments, an expression 305 may be compiled, by compiler 125, into a sequence of objects 440 (e.g., binary objects or input-output object pairs) that are used to build a transducer 130, as depicted in the block flow diagram of FIG. 4. For example, compilation of a linguistic expression (act 305) may produce a sequence of objects 440. These produced objects may then be incorporated into transducers 130.

In some implementations, compiling linguistic source code 120, producing sequences of objects 440, and building one or more transducers 130 from the compiled source code 120 is performed infrequently. For example, transducers that are built from linguistic source code 120 may be applicable and reusable for all natural language of a particular spoken language (e.g., English, German, French) and one or more topic areas (e.g., everyday conversation, sports, medicine, engineering, law, etc.). When improvements or updates are made to the linguistic source code 120, the linguistic source code may be recompiled to produce new transducers 130. Although FIG. 3 depicts only 9 expressions, there can be hundreds of thousands of expressions in linguistic source code 120 to cover all possible words, syntax, and grammar constraints for a particular language (or languages) and to cover multiple topic areas. Because of the large size of the linguistic source code 120, its compilation may take on the order of an hour or more.

As an example of how an expression 305 can be compiled into a sequence of objects, the following simplified expression is considered: a [B<A|b c→]. In this simplified expression, lower-case letters are used to represent words of natural language text and upper-case letters are used to represent identifiers 221 of descriptive data elements 220 or other entities. The example illustrated expression can be understood as follows. In a language space 200 having the word sequence a b c and a descriptive data element A, if A is detected to be left aligned with the word sequence b c (indicated by the symbol sequence "<A|b c→") then start creation of a descriptive data element B at a starting position of A and b.

According to some embodiments, a compiler 125 may be adapted to compile the expression into the following sequence of binary objects:

[1] (<|~: no code
[2] <A>: code1
[3] |<|~: no code
[4] b: no code
[5] c: no code
[6] )<|~: no code where code1 may have the pseudo code: [START_CREATE_WITH_TYPE_BLOCK <B> type=entity weight=1] [OP_END_CREATE_BLOCK].

A binary object may include an input element (shown before the colon in the above list) and a code element (shown after the colon). The input element can comprise an identifier or expressive element, and may be used by the language-processing virtual machine 140 to test for a match with an identifier of a descriptive data element 220 or to create a descriptive data element 220 having the identifier. In the above example, "b" and "c" are examples of identifier elements. An expressive element may indicate a relational aspect between a descriptive data element 220 and one or more preceding or following descriptive data elements. In the above example, "(<|~" is an example of an expressive element. The code element may comprise code or identify (e.g., point to) executable code that is to be executed by the language-processing virtual machine 140. The executable code may modify the language-space data 200 in some way (e.g., add and/or remove descriptive data elements 220) that can provide more information about words present in a received sentence 202 and/or disambiguate the meaning of words in the received sentence. In some cases, the code element may indicate that no code is to be executed for the binary object. Each binary object may also be regarded as a binary pair having an input (input element) and output (code element). The invention is not limited to compilation of expressions into binary objects only. In some implementations, an expression 305 may be compiled into a sequence of objects, of which some or all contain more than two elements.

Figure 5A:
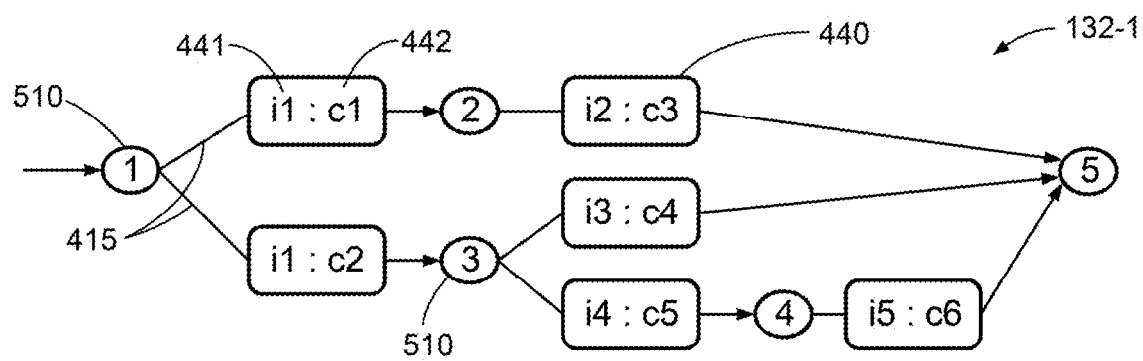
FIG. 5A depicts an example of a finite-state transducer, according to some embodiments.

FIG. 5A illustrates an example of a transducer 130 that may be produced from objects produced from compiled linguistic source code 120. In some embodiments, a finite-state transducer may include a plurality of objects 440 and transitions (indicated by numbered ovals 1-5). In the example of FIG. 5A, a finite state transducer 132-1 is shown containing binary objects 440 having input elements 441 i1-i5 and code elements 442 c1-c5. In some instances, a finite-state transducer may include one or more branching transitions 510, from which two or more trajectories 415 through the finite state transducer are possible. Parallel trajectories 415 from a branching transition can terminate on two or more different objects rather than terminating on a same object. In some cases, a branching transition 510 may be a degenerative branching transition, such as transition (1) in FIG. 5A. For a degenerative branching transition, there are two or more binary objects 440 lying on trajectories from the branching transition that have identical input elements 441. To simplify the drawing, input elements 441 are indicated by the character sequence "iN" and code elements are indicated by the character sequence "cN," where N is a number. When a language-processing virtual machine 140 applies a finite-state transducer 132-1 that includes a degenerative branching transitions 510, then the virtual machine may not know which trajectory 415 through the finite-state transducer is the correct trajectory to follow. This uncertainty can potentially lead to an error condition unless further information is obtained.

A practical example of where a degenerative branching transition may occur is in a computer-implemented analysis of "would" appearing in a sentence, such as "I would." When encountering "would," the language-processing virtual machine may not know whether the word is being used as a verb alone (e.g., having a descriptive element identifier "_V") or as an auxiliary verb in a longer verb phrase (e.g., having a descriptive element identifier "_VAUX") that may be followed by additional words relating to the predicate of the sentence. Accordingly, code executed in a binary object of a language-processing virtual machine depends upon how "would" is used in the sentence. For example, code to be executed by the virtual machine 140 can depend on language-space data 200 that follows a branching transition 510.

Figure 5B:
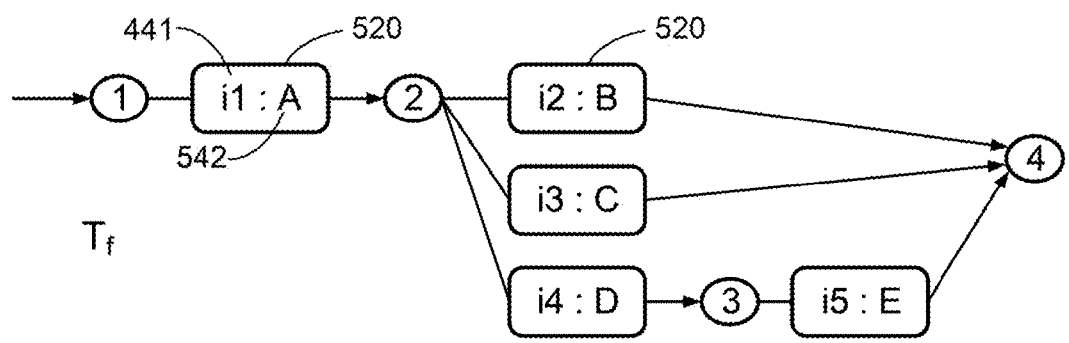
FIG. 5B depicts an example of a bi-machine transducer, according to some embodiments.
Figure 5B:
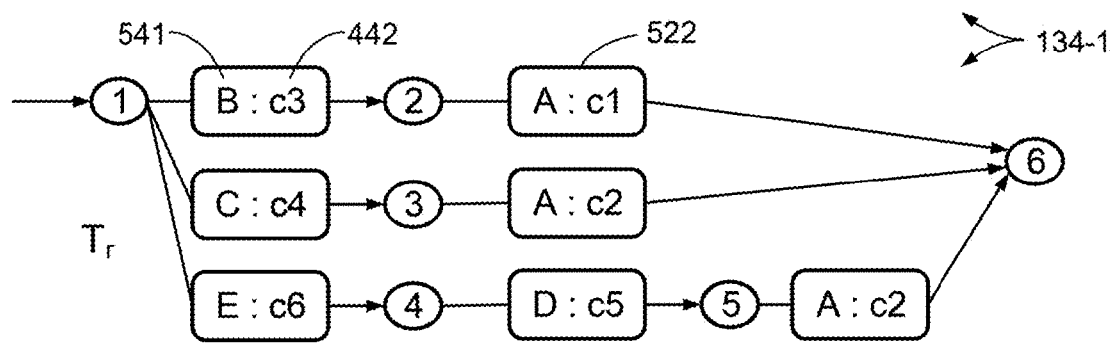

The inventor has recognized and appreciated that bi-machine transducers can remove degenerative branching transitions and avoid potential run-time or output errors of the language-processing virtual machine 140. FIG. 5B illustrates an example bi-machine transducer 134-1. A bi-machine transducer 134-1 may comprise two parts, sometimes referred to as a forward transducer $T_f$ and a reverse transducer $T_r$. Each part includes objects and transitions, like the single finite-state transducer 132-1 shown in FIG. 5A. According to some embodiments, a bi-machine transducer 134-1 can be produced from a corresponding single finite-state transducer 132-1 by a compiler 125, for example.

A forward transducer $T_f$ may include binary objects 520 that include input elements 441 that would appear in a single finite-state transducer 132-1. However, instead of including code elements as outputs the binary objects 520 may include intermediate identifiers 542 which are used for navigating the reverse transducer $T_r$. The reverse transducer $T_r$ may include binary objects 522 having the intermediated identifiers 542 as matching input elements. The binary objects of a reverse transducer may further include code elements 442 that would appear in the single finite-state transducer 132-1.

In operation, the forward transducer $T_f$ would be applied on language-space data 200 first and then the reverse transducer $T_r$ would be applied on an output from a forward transducer. For example, suppose language-space data 200 includes a sequence of two descriptive elements 220 wherein the first has an identifier "i1" and the second has an identifier "i3". A language-processing virtual machine 140 having only a single finite-state transducer 132-1 might hang up after arriving at the degenerative branching transition (1) or execute code in an incorrect path, since it may not know which trajectory 415 is the correct trajectory to follow. As an example, a desired traversal might be from transition (1) to (3) to (5), producing the code sequence "c2", "c4".

In contrast, a language-processing virtual machine 140 having a bi-machine transducer 134-1 has only one option on the forward transducer $T_f$ for a match of the identifier "i1" after transition (1), which indicates the intermediate identifier "A." Similarly, the only possible match after transition (2) (matching "i3") indicates the intermediate identifier "C." The output from the forward transducer is then the sequence of intermediate identifiers "A", "C".

A language-processing virtual machine 140 may then reverse the order of a sequence of intermediate identifiers produced by application of the forward transducer $T_f$, and use the reversed sequence to navigate the reverse transducer $T_r$. In this example, the reverse sequence of intermediate identifiers "C", "A" identifies, without ambiguity, code elements "c4" and "c2" when traversing the reverse transducer. The language-processing virtual machine 140 may then reverse the order of execution of code segments corresponding to the identified sequence of code elements produced by the reverse transducer $T_r$. In this example, the order of execution of code segments would be code segment(s) associated with "c2" first followed by segment(s) associated with "c4," which is the desired sequence. Referring back to FIG. 5A, it can be seen that an identifier sequence "i1", "i3" would produce execution of code segments corresponding to the code element sequence "c2", "c4" if the language-processing virtual machine 140 knew the correct trajectories from the degenerative branching transitions.

The bi-machine transducer 134-1 has no degenerative branching transitions, so that the virtual machine 140 can process language-space data without ambiguity or error. From the above example, it can be verified that the bi-machine transducer 134-1 removes degenerate branching transitions from a single finite-state transducer 132-1 and executes a correct sequence of code segments for any sequence of identifiers 221 that would match to input elements 441 of the single finite-state transducer 132-1 and to the input elements in a corresponding forward transducer $T_f$.

A language-processing virtual machine 140 can apply bi-machine transducers (e.g., to avoid degenerative branching transitions in a single finite-state transducer). A language-processing virtual machine 140 may also apply single finite-state transducers in which there are no degenerative branching transitions, since in these instances a bi-machine transducer is not needed and execution time can be faster than with bi-machine transducers.

Figure 6A:
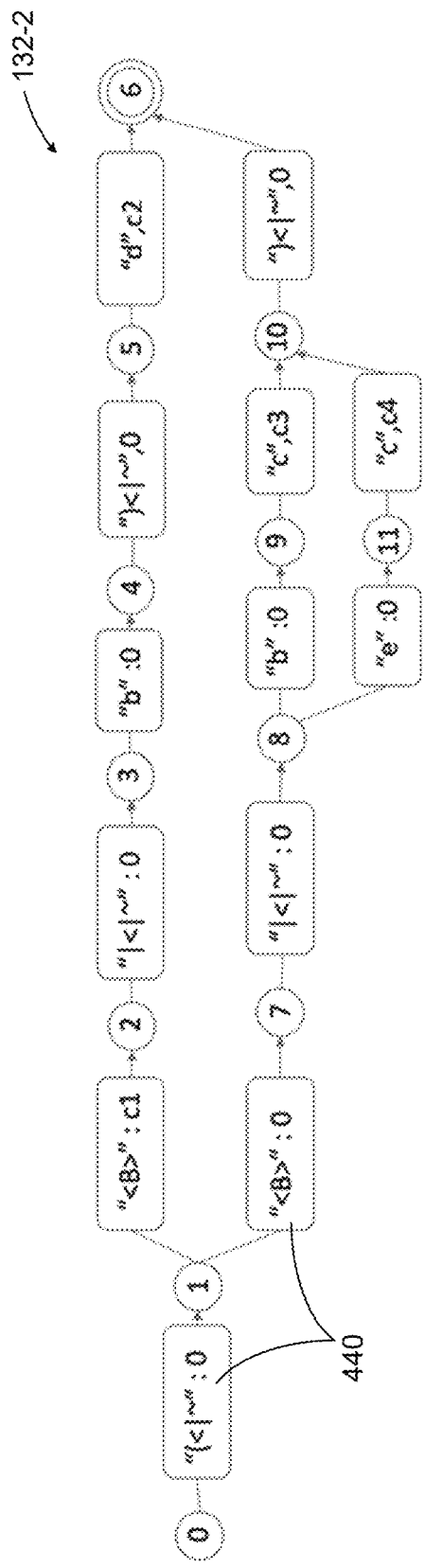
FIG. 6A depicts an example of a finite-state transducer with expressive elements, according to some embodiments.

FIG. 6A depicts an example finite state transducer 132-2, according to some embodiments. The FST of FIG. 6A may be produced from the following three example expressions:
exp1=[BD <B|b~>d]
exp2=<B|b [C]~>
exp3=<B|e [Ec]~>

According to some embodiments, the first expression exp1 may be compiled as the following sequence of objects.
[0] (<|~: no code
[1] <B>: code1
[2] |<|~: no code
[3] b: no code
[4] )<|~: no code
[5] d: code2 [END_CREATE_BLOCK]

where code1 may comprise the pseudo code [START_CREATE_WITH_TYPE_BLOCK <BD> type=entity weight=0] and code2 may comprise the pseudo code [END_CREATE_BLOCK]. The second expression exp2 may be compiled as the following sequence of objects.
[0] (<|~: no code
[1] <B>: no code
[2] |<|~: no code
[3] b: no code
[4] c: code3
[5] )<|~: no code where code3 may comprise the pseudo code [START_CREATE_WITH_TYPE_BLOCK <C> type=entity weight=0] [OP_END_CREATE_BLOCK]. The third expression exp3 may comprise the following sequence of objects.
[0] (<|~: no code
[1] <B>: no code
[2] |<|~: no code
[3] e: no code
[4] c: code4
[5] )<|~: no code where code4 may comprise the pseudo code [START_CREATE_WITH_TYPE_BLOCK <E> type=entity weight=0] [OP_END_CREATE_BLOCK]. By compiling exp1, exp2, and exp3 into sequences of objects that are incorporated into a transducer, the expressions and their object sequences can be applied in parallel on received language-space data 200. Although only three expressions are described for the FST of FIG. 6A, as noted above there can be thousands or more expressions that may be programmed into linguistic source code 120. Accordingly, an FST can be very large in size and yet multiple expressions can be applied in parallel on language-space data 200.

The inventor has recognized and appreciated that it may be difficult to keep track of trajectory information for large FSTs and BMTs when applying a large FST or BMT on a sentence of language-space data 200. According to some embodiments, an FST or BMT may first be applied to language space data for a received sentence (without keeping track of trajectory information) in order to trim trajectories from an FST or BMT that are not relevant to the sentence. In some embodiments, a language-processing virtual machine may apply a large FST or BMT to a received sentence 202 and produce a smaller, trimmed FST having only trajectories providing matches to the sequences of descriptive data elements representative of the received sentence after an initial rendering of the received sentence as a sequence of descriptive data elements 220. An initial rendering of a sentence may be like that shown in FIG. 2. A smaller FST or BMT can be more efficiently and quickly applied to a received sentence than a large FST or BMT. In other embodiments, trajectory information may be stored in memory 102 as the FST or BMT is applied, and a smaller FST or BMT may not be produced.

If a reduced-size FST or BMT is generated, then it may be applied to a received sentence and transition information may be retained more easily in memory as the FST or BMT is applied. FIG. 6B depicts an example of a reduced-size FST 610 after a first application of the FST 132-2 of FIG. 6A to language-space data 602 depicted in FIG. 6C. For the language-space data 602, the first sentence bound (indicated by the dollar sign $) may occur at the $0^{th}$ position and the last sentence bout may occur at the $5^{th}$ position. Also shown in FIG. 6B is example transitional data 630 that the language-processing virtual machine 140 may keep track of (e.g., store temporarily) when applying the reduced-size FST 610. The transition data 630 may include information relevant to processing of the received sentence 202 that can help the language-processing virtual machine 140 navigate trajectories of the FST or BMT. In some implementations, the transition data 630 may include information that is useful to the language-processing virtual machine 140 for performing a subsequent operation relevant to a subsequent object 440 on a trajectory 415.

As an example, transition data 610 associated with a first expression exp1 above will now be described in more detail. The sequence of objects for exp1 above can be considered as the following sequence of inputs: "(<|~", "<B>", "|<|~", "b", ")<|~", and "d". These input elements may be understood as follows:
(<|~: start of a sequence where the second part needs to be left aligned with the first part.
<B>: matching a block labeled "<B>"
|<|~: transitioning to the second argument of the "left-aligned" operator
b: matching a block labeled "b")
<|~: finishing the second argument of the "left-aligned" operator
d: matching a block labeled "d"

Figure 6C:
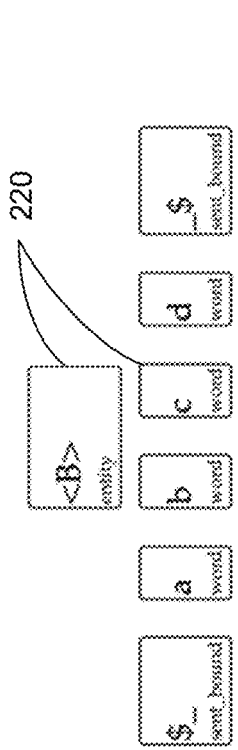
FIG. 6C depicts a simplified example of language-space data for explanation purposes.
Figure 6B:
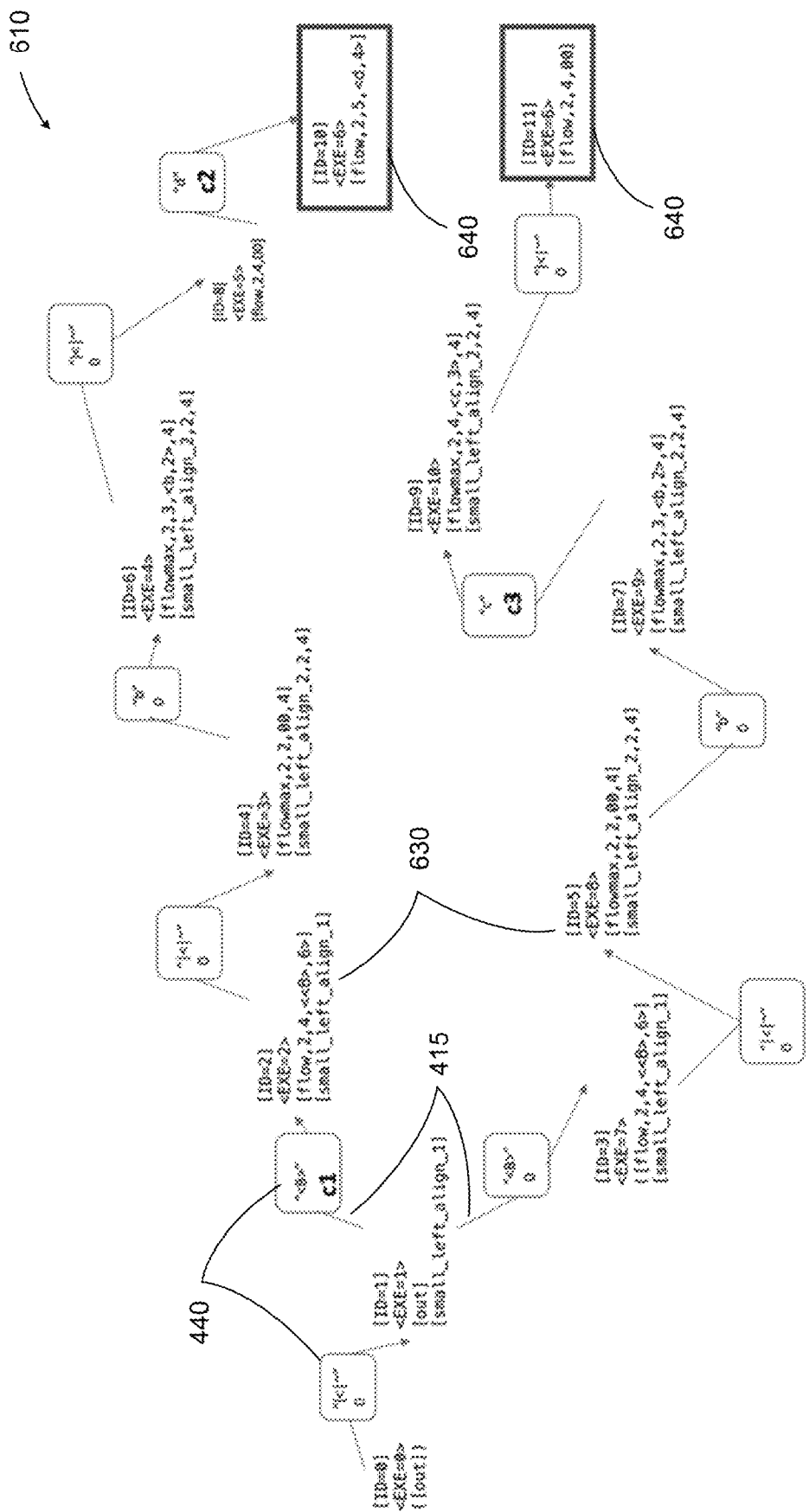
FIG. 6B depicts an example of a reduced finite-state transducer and transitional data, according to some embodiments.

Applying the expression exp1 on the language-space data 602 of FIG. 6C can work in two steps, according to some embodiments. In a first step, the language-processing virtual machine 140 may find if the sequence of input elements of the object pairs generated from an expression match a sequence of identifiers in the language-space data 602. In a second step, if there is a matching sequence of identifiers, then the language-processing virtual machine 140 can apply the code given by the outputs of the sequence of object pairs.

According to some embodiments, the first step can determine the execution trace carried out by the language-processing virtual machine 140. The execution trace can result in producing a sequence of transitional data 630, by the language-processing virtual machine 140, that may be represented as in the following list. The transitional data 630 may be produced and stored as the reduced FST 610 is applied to the language-space data. According to some implementations, the language-processing virtual machine 140 may use a first reference value (e.g., [ID=N] ) to indicate an execution step within the execution trace. In some cases, the language-processing virtual machine 140 may further use a second reference value (e.g., <EXE=M>) to indicate a position within the compiled expression exp1. For the present example, M has 0 to 6 as possible values: 0 (<|~, 1<B>, 2 |<|~, 3 b, 4)<|~, 5 d, 6. Also included in the transitional data 630 may be information useful for performing subsequent operations along a trajectory for subsequent objects 440. This information is represented by entries such as "([nm][small_left_align_1])" in the following list, but the invention is not limited to the information and format shown in the list.

[ID=0] <EXE=0> ([nm] )
[ID=1] <EXE=1> ([nm][small_left_align_1] )
[ID=2] <EXE=2> ([flow,2,4,<<B>,6>] [small_left_align_1] )
[ID=3] <EXE=3> ([flowmax,2,2,00,4] [small_left_align_2,2,4] )
[ID=4] <EXE=4> ([flowmax,2,3,<b,2>, 4] [small_left_align_2,2,4] )
[ID=5] <EXE=5> ([flow,2,4,00] )
[ID=6] <EXE=6> ([flow,2,5,<d,4>] )

In a further detailed example, a first execution in an execution sequence

[ID=0] <EXE=0> ([nm] )

may include transition data 630 that indicates a beginning of an expression (<EXE=0>). The transitional data 630 may further include information ([nm] ) that indicates there is no current match yet made.

After encountering a first object from the compiled expression at [ID=1], a symbol sequence or expressive element "(<|~" may be recognized by the language-processing virtual machine 140 as a start of left aligned operator. The current status of applying the FST 610 may be reflected in a subsequent entry in transitional data as "([nm] [small_left_align_1] )", which may indicate there is no current match and that the system is within a first argument of a "left-aligned" operator.

After encountering a next object from the compiled expression (e.g., [ID=2] or [ID=3] in FIG. 6B), the language-processing virtual machine 140 may identify a match between an input element "<B>" in the object 440 and an identifier "B" in a descriptive data element 220 of the language space data 602 of FIG. 6C. The current status of applying the FST 610 may be reflected in a subsequent entry in transitional data as "[flow,2,4,<<B>,6>] [small_left_align_1]." According to some embodiments, a first identifier (e.g., "flow") may be used to indicate a match has been detected and the system is in a matching mode, a first value ("2" in this example) may be used to indicate a starting position of the match, and a second value ("4" in this example) may be used to identify a starting position for a next descriptive data element 220 following the match since B in this example extends from position 2 to 3. A matching symbol "<B>" may also be included in the transitional data 630. In some implementations, a unique identifier ("6" in this example) for a matched descriptive data element 220 may be included in the transitional data 630.

After encountering a next object from the compiled expression (e.g., at [ID=4] or [ID=5] in FIG. 6B), the language-processing virtual machine 140 may identify an expressive element "|<|~" which can indicate completion of the first argument of the "left-aligned" operator and a transition to the second argument of the left-aligned operator. Because the second argument needs to be left aligned, it should have the same starting position as the matched identifier of the descriptive data element 220 "B". Referring to FIG. 6C, this starting position is 2. Because the second argument should not go beyond the end of "B", transitional data 630 may also include a maximum ending position for the second argument (4 in this example). According to some embodiments, the transitional data may be stored as "([flowmax,2,2,01,4]", or any suitable representation, which can be interpreted as: current matching started at position 2, match at position 2 also, there is one block "B" currently matched (indicated as "01" in this example), and the matching should not exceed "4" as ending position. According to some embodiments, transitional data 630 may further store the span of the first argument (2 to 4 in this example) as "[small_left_align_2,2,4]" or any suitable representation, which can be interpreted as continuing within the second argument of the "left-aligned" operator where the first argument started at 2 and ended at 4.

By using transitional data 630 to keep track of execution steps, the language-processing virtual machine 140 may apply expressions in parallel directly to language space data 602 and determine which trajectories 415 and objects 440 successfully match to descriptive data elements 220 in the language space data 602 and lead to appropriate final transitional data 640, indicated by the bold rectangle. Similar execution processes and transitional data 630 can apply to bi-machine transducers 134.

Referring again to FIG. 2, because some execution steps may modify the language-space data 200 (e.g., by adding or removing descriptive data elements 220), an FST or BMT may be applied one or more times to the language-space data 200. In some implementations, an FST or BMT may be applied until there are no further changes in the language-space data 200. FIG. 7 depicts an example of modified language-space data 700 that can be produced from initial language-space data 200, according to the present embodiments. Through repeated applications of an FST or BMT, descriptive data elements 230 spanning multiple words of a sentence may be added and provide further information about word, sentence and/or sub-sentence structure. Some of the descriptive data elements 220*a*, 220*b* may indicate that a named human is included in a sentence, and may further indicate a particular type of activity (e.g., a descriptive data element 220*b* indicating relevance to reading books). Such descriptive data elements may aid in automated searching of text.

In the example of FIG. 7, all descriptive data elements have been determined to be certain (indicated by the gray shading in this example) by the language-processing virtual machine 140 based on traversals through an FST and/or BST. Accordingly, a language-processing virtual machine 140 may further indicate a level of confidence in the accuracy for a processed sentence. For example, a level of confidence in the accuracy of the processed sentence in the current example may be reported as 100%.

Figure 8:
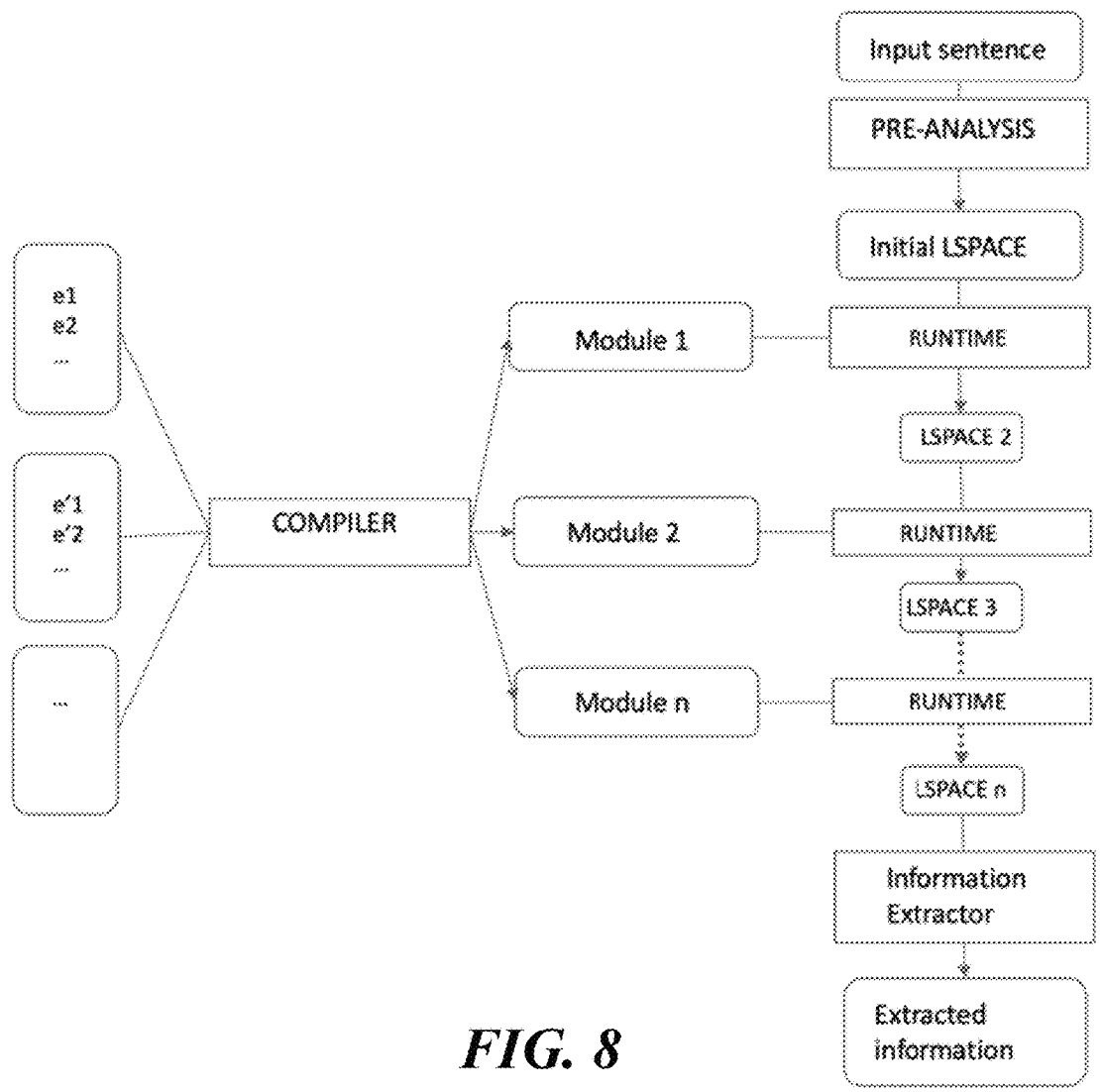
FIG. 8 illustrates an example of multiple finite state transducer and/or bi-machine transducer modules that may be applied separately to language-space data and modified language-space data, according to some embodiments.
Figure 9:
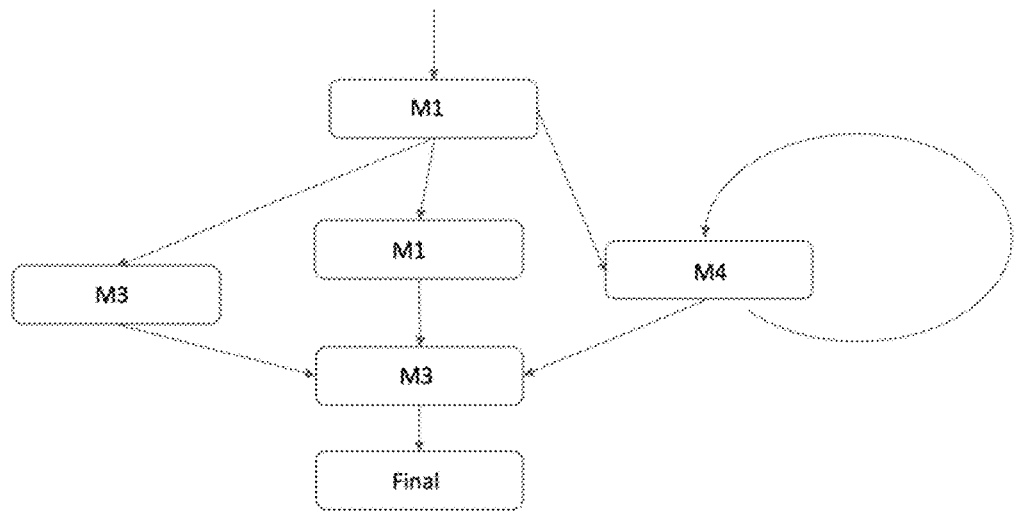
FIG. 9 illustrates an example of ways in which multiple finite state transducer and/or bi-machine transducer modules may be applied to language-space data and modified language-space data, according to some embodiments.

Although the above example in connection with FIG. 6A and FIG. 6B, describe a single FST that is produced from linguistic source code 120 applied to a sentence of natural language text 105, in some embodiments multiple FSTs or BMTs may be produced from linguistic source code 120 and applied as separate modules to natural language text 105. An example of multiple FSTs or BMTs applied separately is shown in FIG. 8. In this example, different sets of expressions may be compiled into different modules. For example, a first set of expressions e1, e2, e3, ... eN may be compiled into a first module (Module 1), and a second set of expressions e1', e2', e3' ... eN' may be compiled into a second module (Module 2). The modules may then each be applied one or more times to language space data to produce modified language space data (indicated by LSPACE 2, LSPACE 3, LSPACE n, etc.). A final modified language space data may be provided to an information extractor to produce targeted extracted information. In some embodiments, multiple modules may be applied to language space data in any suitable order, once or repeatedly, and in parallel, as indicated in FIG. 9.

A language-processing virtual machine 140 that employs language space data 200, finite-state transducers 132-*n*, and bi-machine transducers 134-*n* according to the present embodiments can analyze text significantly faster than conventional approaches. Some conventional approaches may analyze text by codifying linguistic constraints into rules that are stored in look-up tables, searching the tables for a correct rule, and applying the rule on the text directly. When the number of linguistic constraints becomes large (e.g., thousands or tens of thousands of constraints) and sentence length is long (e.g., longer than 12 words), orders of magnitude improvements in analysis speed can be achieved according to the present embodiments. For example, a sentence of about 15 words can be analyzed by a personal computer using the present methods about 100 times faster than the same sentence is analyzed by the Stanford Parser, which is available on-line. The difference in speed is even greater for longer sentences. The increase in speed is due in part to the avoidance of a large number of look-ups when traversing finite-state transducers or bi-machine transducers.

The present embodiments exhibit additional advantages over conventional methods. Because the source code comprises instructions and terms familiar to or quickly understood by linguists, linguists can more easily express precise linguistic constraints that may otherwise would be expressed imprecisely in conventional approaches based on standard computer-programming languages. Because of improved preciseness with which linguistic constraints can be expressed, the present embodiments can process natural language text more accurately than convention natural language processors on many types of input.

Another feature of the present embodiments is that the accuracy with which text is analyzed can be tracked for each sentence. For example, the language-processing virtual machine 140 can determine whether unambiguous matches have or have not been made for at least one identifier 221, 441 of a descriptive data element 220, 440 within a sentence and whether certainty criteria have been satisfied for the descriptive data element. According to some embodiments, if unambiguous matches have been made and/or certainty criteria satisfied, the virtual machine 140 may indicate (e.g., with data in the modified language space) a level of confidence in interpreting a word in the received sentence (e.g., that the interpretation of the descriptive data element is 100% accurate). In cases where a certain match may not be found for at least one descriptive data element 220, 440 in a sequence of descriptive elements for a sentence, the virtual machine 140 may indicate (e.g., with data in the modified language space) that the interpretation of the descriptive data element and/or sentence is partially accurate or not known. Indicating that an interpretation of a sentence is not known can be helpful, because it can allow a user to review the sentence and identify instances for which the virtual machine 140 should not be used or for which further refinement of the language-processing system 100 is needed (e.g., where changes may be needed to source code 120).

Figure 10:
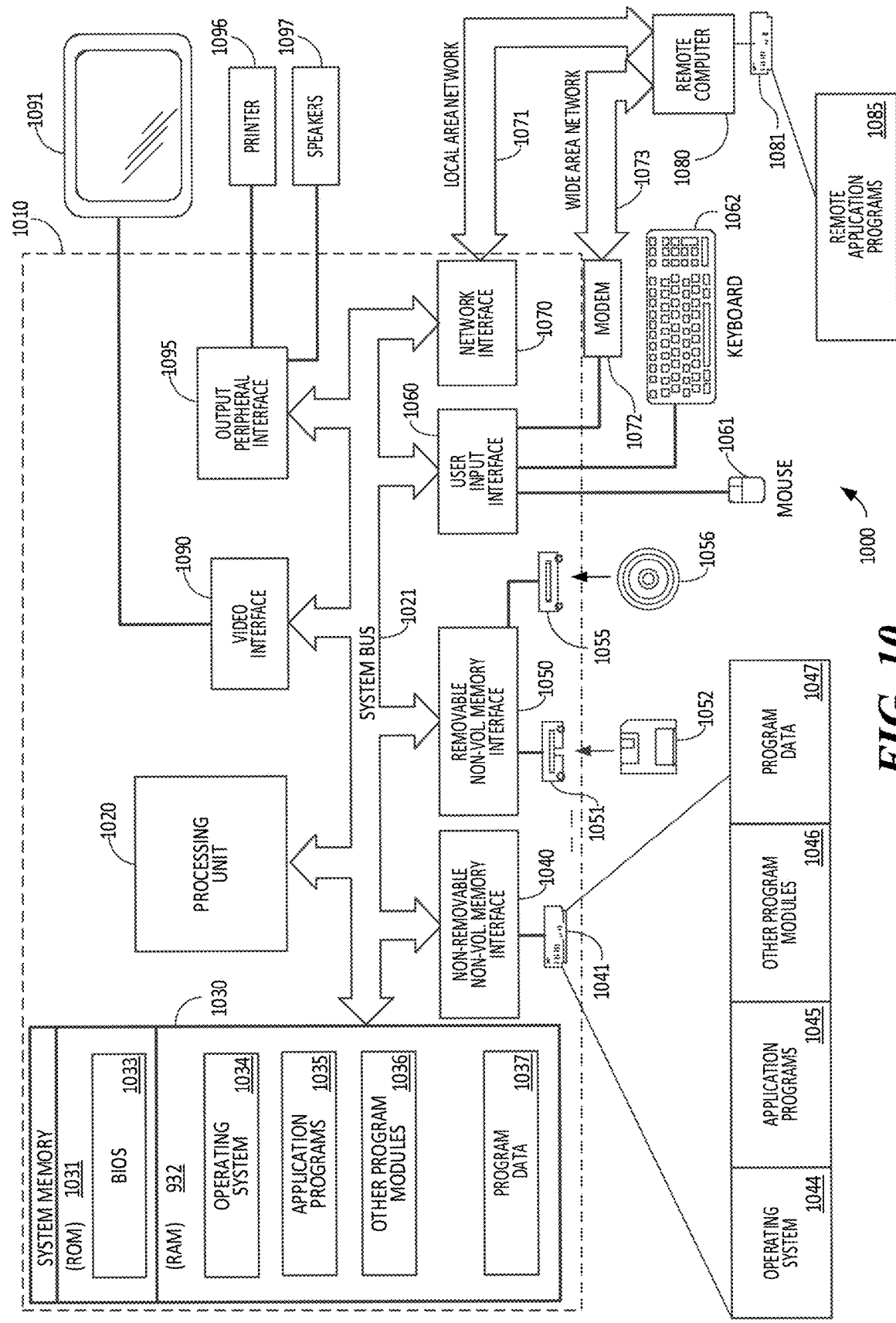
FIG. 10 illustrates an example computing environment that may be adapted to implement a language-processing system of the present embodiments.

FIG. 10 depicts, in further detail, components of a data-processing device that may be included in a device adapted for operation in a language-processing system 100 of the present embodiments. Some or all of the components shown may be present in a language-processing system 100, for example. In a distributed computing environment, some components may be located on a server and some components may be located on a client device. In some embodiments, a device for implementing a language-processing system 100 may include a computing device 1010. Components of computing device 1010 may include, but are not limited to, a processing unit 1020, a memory 1030, and a bus 1021 that couples various components including the memory to the processing unit 1020. The bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 may include one or more types of machine-readable media. Machine-readable media can be any available media that can be accessed by computer 1010 and includes both volatile and nonvolatile, manufactured storage media, removable and non-removable manufactured storage media. By way of example, and not limitation, machine-readable media may comprise information such as computer-readable instructions, data structures, program modules or other data. Machine-readable media includes, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information and which can accessed by computer 1010.

The memory 1030 may include computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, may be stored in ROM 1031. RAM 1032 may contain data and/or program modules that are immediately accessible to and/or presently being operated on by processing unit 1020. By way of example, and not limitation, FIG. 10 illustrates an operating system 1034, application programs 1035, other program modules 1036, and program data 1037.

The computer 1010 may also include other removable/non-removable, volatile/nonvolatile machine-readable media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile machine-readable media that can be used in the exemplary operating environment include, but are not limited to, magnetic tape cassettes, flash memory cards, digital versatile disks, digital video tape, solid state RAM, solid state ROM, and the like. The hard disk drive 1041 may be connected to the system bus 1021 through a non-removable memory interface such as interface 1040, and magnetic disk drive 1051 and optical disk drive 1055 may be connected to the system bus 1021 by a removable memory interface, such as interface 1050.

The drives and their associated machine-readable media discussed above and illustrated in FIG. 10, provide storage of machine-readable instructions, data structures, program modules and other data for the computer 1010. In FIG. 10, for example, hard disk drive 1041 is illustrated as storing operating system 1044, application programs 1045, other program modules 1046, and program data 1047. These components may either be the same as, or different from, operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices may be connected to the processing unit 1020 through a user input interface 1060 that is coupled to the system bus, but may be connected by other interface and bus structures, such as a parallel port, game port or a universal serial bus (USB). A monitor 1091 or other type of display device may also be connected to the system bus 1021 via an interface, such as a video interface 1090. In addition to the monitor, a computing device 1010 may also include other peripheral output devices such as speakers 1097 and printer 1096, which may be connected through a output peripheral interface 1095.

The computer 1010 may operate in a networked environment using logical connections to one or more remote devices, such as a remote computer 1080. The remote computer 1080 may be a personal computer, a server, a router, a network PC, a peer device or other common network node, and may include many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments may be commonplace in offices, enterprise-wide computer networks, intranets and the Internet. Network connections may be wired, optical fiber based, or wireless.

When used in a LAN networking environment, the computer 1010 may be connected to the LAN 1071 through a network interface or adapter 1070. When used in a WAN networking environment, the computer 1010 may include a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in a remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Various configurations and operating methods of a language-processing system 100 are possible. Example configurations and methods are listed below.

(1) A method of automated processing of text, the method comprising: processing the text to generate a language space having one or more descriptive data elements associated with one or more words in the text and for which a word has multiple meanings; and executing an operation with a first finite-state transducer or first bi-machine transducer to process a sentence in the language space containing the word, wherein the operation comprises: identifying a match between a first input element in the first finite-state transducer or first bi-machine transducer and a first identifier of a first descriptive data element in the language space associated with a word in the sentence; identifying an expressive element in the first finite-state transducer or first bi-machine transducer following the first input element, wherein the expressive element indicates a relational aspect between the first descriptive data element and a second descriptive data element in the language space; in response to identifying the expressive element, updating transition data that tracks relational aspects of descriptive data elements in the language space; and executing a first code segment, based at least in part on the updated transition data, to produce a modified language space in which the meaning of the word in the sentence associated with the first descriptive data element is disambiguated.

(2) The method of (1), further comprising producing a second finite state transducer or second bi-machine transducer for the sentence from an application of the first finite-state transducer or first bi-machine transducer to the sentence, wherein the second finite-state transducer or second bi-machine transducer has significantly less data than the first finite-state transducer or first bi-machine transducer.

(3) The method of (2) wherein executing the first code segment comprises: selecting the first code segment that is identified, in the second finite-state transducer or second bi-machine transducer, as being associated with the first input element; and executing the first code segment to produce the modified language space.

(4) The method of (2) or (3), wherein producing the second finite state transducer comprises: identifying first paths in the first finite-state transducer or first bi-machine transducer that include a sequence of input elements in a same order as matching identifiers of descriptive data elements in the sentence; including the first paths in the second finite-state transducer or second bi-machine transducer; and excluding from the second finite-state transducer or second bi-machine transducer second paths in the first finite-state transducer or first bi-machine transducer that do not have a sequence of input elements in a same order as matching identifiers of descriptive data elements in the sentence.

(5) The method of any one of (1) through (4), further comprising processing the modified language space to extract information from the text and wherein the first bi-machine transducer includes a forward and reverse transducer.

(6) The method of (5), wherein processing the modified language space comprises performing a search query on the modified language space for all sentences containing words having the meaning of the word.

(7) The method of any one of (1) through (6) wherein the relational aspect comprises information about a position of the first descriptive data element within the sentence.

(8) The method of any one of (1) through (7), further comprising producing the first descriptive data element for the word as a data structure that includes an identifier, wherein the identifier is associated with or indicative of a characteristic of the word.

(9) The method of (8), wherein the characteristic is a part of speech for which the word can be used.

(10) The method of any one of (1) through (9), further comprising including with the first descriptive data element information about a position of the word within the sentence.

(11) The method of any one of (1) through (10), wherein the expressive element indicates that the first descriptive data element begins at a same position within the sentence as the second descriptive data element.

(12) The method of any one of (1) through (10), wherein the expressive element indicates that the first descriptive data element ends at a same position within the sentence as the second descriptive data element.

(13) The method of any one of (1) through (10), wherein the expressive element indicates that the first descriptive data element is within positions in the sentence spanned by the second descriptive data element.

(14) The method of any one of (1) through (13), wherein the first finite-state transducer or first bi-machine transducer comprises a plurality of objects and associated paths and an object comprises: an input element that can be matched to an identifier of a descriptive data element; and an identifier for a code segment that can be executed by a processor.

(15) The method of (14), wherein the code segment comprises an instruction to modify the language space.

(16) The method of (14), wherein the code segment comprises an instruction to create a descriptive data element and add the descriptive data element to the language space.

(17) The method of (14), wherein the code segment comprises an instruction to indicate a level of certainty for a descriptive data element in the language space.

(18) The method of any one of (1) through (17), wherein the first input element is included in a first object for a forward transducer and an identifier for the first code segment is included in a second object of a reverse transducer for the bi-machine transducer.

(19) The method of (18), wherein the act of identifying a match further comprises identifying a match between a first intermediate identifier of the first object and a second intermediate identifier of the second object.

(20) The method of any one of (1) through (19), wherein executing the first code segment comprises: retaining or writing a third descriptive data element in the modified language space that is associated with the word; and deleting or excluding a fourth descriptive data element from the modified language space that indicates an alternative meaning of the word.

(21) The method of any one of (1) through (20), further comprising adding to the modified language space a descriptive data element that was not in the language space and that provides additional information about the word.

(22) A language-processing system comprising at least one processor programmed to: process text that includes one or more sentences to generate a language space having one or more descriptive data elements that are associated with words in the text; apply a first finite-state transducer or first bi-machine transducer to process sentences in the language space; and identify an expressive element in the first finite-state transducer or first bi-machine transducer that identifies a relational aspect between a first descriptive data element and a second descriptive data element in a sentence of the language space.

(23) The language-processing system of configuration (22), wherein the at least one processor is further programmed to: identify a match between a first input element in the first finite-state transducer or first bi-machine transducer and a first identifier of the first descriptive data element in the language space associated with a word in the sentence; and in response to identifying the expressive element, update transition data that tracks relational aspects of descriptive data elements in the language space; and execute a first code segment, based at least in part on the updated transition data, to produce a modified language space in which the meaning of the word in the sentence associated with the first descriptive data element is disambiguated.

(24) The language-processing system of configuration (23), wherein the at least one processor is further programmed to: receive a search query; perform a search on the modified language space for all sentences containing words having the meaning of the word; and identify instances of words in the modified language space having the meaning of the word.

(25) The language-processing system of any one of configurations (22) through (24), wherein the first finite-state transducer or first bi-machine transducer are applied by a virtual machine that is implemented with programming instructions on the language-processing system.

(26) The language-processing system of any one of configurations (22) through (25), wherein the first finite-state transducer or first bi-machine transducer includes a plurality of objects and associated paths and at least one object comprises: an input element that can potentially match to an identifier of a descriptive data element for a word in the language space; and an identifier for a code segment that can be executed by a processor.

(27) The language-processing system of any one of configurations (22) through (26), wherein the at least one processor is further programmed to produce a second finite state transducer or second bi-machine transducer for the sentence from an application of the first finite-state transducer or first bi-machine transducer to the sentence, wherein the second finite-state transducer or second bi-machine transducer has significantly fewer objects than the first finite-state transducer or first bi-machine transducer.

(28) The language-processing system of any one of configurations (22) through (27), wherein the first bi-machine transducer includes a forward transducer and reverse transducer, wherein the forward and reverse transducers comprise objects.

(29) The language-processing system of configuration (28), wherein a first object of the forward transducer comprises: an input element that potentially matches an identifier in a descriptive data element of the language space; and a first intermediate identifier that potentially matches to a second intermediate identifier of a second object in the reverse transducer, and wherein the second object of the reverse transducer comprises: the second intermediate identifier that matches to the first intermediate identifier of the first object in the forward transducer; and an identifier for a code segment to be executed in response to the language-processing system detecting a match between the first intermediate identifier and the second intermediate identifier.

(30) Computer-readable medium encoding instructions that, when executed by at least one processor, adapt the at least one processor to: process text that includes one or more sentences to generate a language space that includes one or more descriptive data elements associated with one or more words in the text, wherein a word in the text has multiple meanings; and execute an operation with a finite-state transducer or bi-machine transducer to process a sentence in the language space containing the word, wherein the operation comprises: identifying a match between an input element in the finite-state transducer or bi-machine transducer and an identifier of a first descriptive data element in the language space associated with the word in the sentence; identifying an expressive element in the finite-state transducer or bi-machine transducer following the input element, wherein the expressive element identifies a relational aspect between the first descriptive data element and a second descriptive data element in the language space; in response to identifying the expressive element, updating transition data that records relational aspects of descriptive data elements in the language space; and executing a code segment, based at least in part on the updated transition data, to produce a modified language space in which the meaning of the word in the sentence associated with the first descriptive data element is disambiguated.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method of automated processing of text, the method comprising:
   processing the text to generate a language space that includes descriptive data elements configured as first ordered sequences that are associated with a plurality words in the text and for which a first word of the plurality of words has multiple meanings; and
   applying a first transducer to process the descriptive data elements in the language space and to disambiguate a meaning of the first word, wherein:
      the first transducer comprises binary objects configured as second ordered sequences that are traversed by one or more trajectories through the first transducer,
      each of the binary objects of the first transducer comprises an input element,
      at least one of the binary objects further comprises a code element, wherein the code element includes executable computer code,
      the applying comprises comparing input elements of at least a portion of the binary objects in the one or more trajectories to at least a portion of the descriptive data elements in the language space, and
      a first input element of the portion of the binary objects is an expressive element that identifies an ordered matching criteria for at least a first descriptive data element of the portion of the descriptive data elements with respect to a second descriptive data element of the portion of the descriptive data elements, wherein the expressive element further identifies a relational aspect of the first descriptive data element with respect to the second descriptive data element in the language space for the ordered matching criteria to be satisfied;
   detecting a first match between the first descriptive data element and a second input element of the input elements;
   detecting a second match between the second descriptive data element and a third input element of the input elements;
   determining, based at least on the first match and the second match, that the ordered matching criteria identified by the first input element is satisfied; and
   executing the executable computer code in response to at least the ordered matching criteria being satisfied.

2. The method of claim 1, wherein the ordered matching criteria comprises the second descriptive data element having a same start position for a sentence containing the first word as the first descriptive data element in two ordered sequences of the first ordered sequences.

3. The method of claim 1, wherein the ordered matching criteria comprises the first descriptive data element extending over a span from a first start position to a first stop position for a sentence containing the first word in an ordered sequence of the first ordered sequences and the second descriptive data element having a second start position that is inclusively within the span from the first start position to the first stop position.

4. The method of claim 1, wherein the executable computer code adds or removes a descriptive data element to or from the language space.

5. The method of claim 4, wherein the added descriptive data element further describes at least one descriptive data element of the portion of the descriptive data elements where the at least one descriptive data element is inclusively within a span of positions in the language space identified by the added descriptive data element.

6. The method of claim 1, wherein executing the executable computer code results in removing one or more descriptive data elements of the portion of the descriptive data elements from the language space to produce a modified language space that disambiguates the meaning of the first word.

7. The method of claim 6, further comprising processing the modified language space to extract information from the text based on the meaning of the first word.

8. The method of claim 7, wherein processing the modified language space comprises performing a search query on the modified language space for all sentences in the text containing words having the meaning of the first word.

9. The method of claim 1, wherein executing the executable computer code results in generating and adding one or more descriptive data elements to the language space to produce a modified language space.

10. The method of claim 1, wherein executing the executable computer code comprises indicating a level of certainty for a descriptive data element that has been determined to be the meaning for the first word in the language space, wherein the level of certainty indicates an amount of confidence that the meaning is a correct meaning for the first word.

11. The method of claim 1, further comprising:
   producing, from the first transducer, a second transducer for processing the portion of descriptive data elements in the language space, wherein the second transducer has significantly less data than the first transducer.

12. The method of claim 11, wherein producing the second transducer comprises excluding from the second transducer binary objects on trajectories in the first transducer that do not match to any ordered sequence of the portion of descriptive data elements included in the first ordered sequences.

13. The method of claim 1, wherein the first transducer is formed as a bi-machine transducer having a forward transducer and a reverse transducer.

14. The method of claim 13, wherein the first input element is located in the forward transducer and the code element is located in the reverse transducer.

15. Non-transitory computer-readable medium encoding instructions that, when executed by at least one processor, adapt the at least one processor to:
process received text to generate a language space that includes descriptive data elements configured as first ordered sequences that are associated with a plurality words in the text and for which a first word of the plurality of words has multiple meanings; and
apply a first transducer to process the descriptive data elements in the language space and to disambiguate a meaning of the first word, wherein:
the first transducer comprises binary objects configured as second ordered sequences that are traversed by one or more trajectories through the first transducer,
each of the binary objects of the first transducer comprises an input element,
at least one of the binary objects further comprises a code element, wherein the code element includes executable computer code,
the applying comprises comparing input elements of at least a portion of the binary objects in the one or more trajectories to at least a portion of the descriptive data elements in the language space, and
a first input element of the portion of the binary objects is an expressive element that identifies an ordered matching criteria for at least a first descriptive data element of the portion of the descriptive data elements with respect to a second descriptive data element of the portion of the descriptive data elements,
wherein the expressive element further identifies a relational aspect of the first descriptive data element with respect to the second descriptive data element in the language space for the ordered matching criteria to be satisfied;
detect a first match between the first descriptive data element and a second input element of the input elements;
detect a second match between the second descriptive data element and a third input element of the input elements;
determine, based at least on the first match and the second match, that the ordered matching criteria identified by the first input element is satisfied; and
execute the executable computer code in response to at least the ordered matching criteria being satisfied.

16. The non-transitory computer-readable medium of claim 15, wherein the ordered matching criteria comprises the first descriptive data element extending over a span from a first start position to a first stop position in a first ordered sequence of the first ordered sequences for a sentence containing the first word and the second descriptive data element having a second start position that is inclusively within the span from the first start position to the first stop position.

17. The non-transitory computer-readable medium of claim 15, wherein the executable computer code adds or removes a descriptive data element to or from the language space.

18. The non-transitory computer-readable medium of claim 17, wherein the added descriptive data element further describes at least one descriptive data element of the portion of the descriptive data elements where the at least one descriptive data element is inclusively within a span of positions in the language space identified by the added descriptive data element.

19. The non-transitory computer-readable medium of claim 15, wherein the instructions further adapt the at least one processor to:
remove at least one descriptive data element of the portion of descriptive data elements to produce a modified language space in response to executing the executable code; and
process the modified language space to extract information from the text based on the meaning of the first word.

20. The non-transitory computer-readable medium of claim 15, wherein the instructions further adapt the at least one processor to:
produce, from the first transducer, a second transducer for processing the portion of descriptive data elements in the language space, wherein the second transducer has significantly less data than the first transducer.

21. A method of automated processing of text, the method comprising:
processing the text to generate a language space that includes descriptive data elements configured as first ordered sequences that are associated with a plurality words in the text and for which a first word of the plurality of words has multiple meanings; and
applying a first transducer to process the descriptive data elements in the language space and to disambiguate a meaning of the first word, wherein:
the first transducer comprises binary objects configured as second ordered sequences that are traversed by one or more trajectories through the first transducer;
each of the binary objects of the first transducer comprises an input element,
at least one of the binary objects further comprises a code element, wherein the code element includes a pointer to executable computer code that, when executed, modifies the language space by adding or removing at least one descriptive data element to or from the language space;
the applying comprises comparing input elements of at least a portion of the binary objects in the one or more trajectories to at least a portion of the descriptive data elements in the language space; and
a first input element of the portion of the binary objects is an expressive element that identifies an ordered matching criteria for at least a first descriptive data element of the portion of the descriptive data elements with respect to a second descriptive data element of the portion of the descriptive data elements, wherein the expressive element further identifies a relational aspect of the first descriptive data element with respect to the second descriptive data element in the language space for the ordered matching criteria to be satisfied;
detecting a first match between the first descriptive data element and a second input element of the input elements;

detecting a second match between the second descriptive data element and a third input element of the input elements;

determining, based at least on the first match and the second match, that the ordered matching criteria identified by the first input element is satisfied; and executing the executable computer code in response to at least the ordered matching criteria being satisfied.

22. The method of claim 21, wherein the ordered matching criteria comprises the second descriptive data element having a same start position for a sentence containing the first word as the first descriptive data element in two ordered sequences of the first ordered sequences.

23. The method of claim 21, wherein the first transducer is formed as a bi-machine transducer having a forward transducer and a reverse transducer.

24. The method of claim 23, wherein the first input element is located in the forward transducer and the code element is located in the reverse transducer.

* * * * *